United States Patent [19]

McBain et al.

[11] Patent Number: 5,110,881

[45] Date of Patent: May 5, 1992

[54] POLYMERIZABLE ORGANIC RESIN COMPOSITION

[75] Inventors: Douglas S. McBain, Norton; John C. Crano, Akron, both of Ohio

[73] Assignee: PPG Industries, Inc., Pittsburgh, Pa.

[21] Appl. No.: 639,462

[22] Filed: Jan. 10, 1991

Related U.S. Application Data

[62] Division of Ser. No. 339,850, Apr. 18, 1989, Pat. No. 4,994,208.

[51] Int. Cl.$^5$ .................. C08F 283/02; C08F 26/02
[52] U.S. Cl. .................... 525/455; 525/404; 525/920; 526/301; 526/314
[58] Field of Search ........... 526/301, 314; 525/404, 525/455, 920

[56] References Cited

U.S. PATENT DOCUMENTS 4,360,653 11/1982 Stevens et al. .................. 526/314

Primary Examiner—Paul R. Michl
Assistant Examiner—Yong S. Lee
Attorney, Agent, or Firm—Irwin M. Stein

[57] ABSTRACT

A photochromic article having improved pohotochromic equilibrium response is described. In particular, a phtochromic compound is incorporation into or applied to an article, e.g., matrix, of a synthetic organic resin prepared from a composition comprising from about 55 to about 90 weight percent of a polyol(allyl carbonate), e.g., diethylene glycol bis(allyl carbonate), from about 10 to about 40 weight percent of an aliphatic polyurethane having terminal ethylenic unsaturation, e.g., an aliphatic polyesterurethane diacrylate, and from about 0 to about 5 weight percent of a difunctional monomer selected from the group consisting of allyl methacrylate and allyl acrylate. Such photochromic articles have an improved photochromic equilibrium response at ambient temperatures compared to the response of a comparable photochromic article prepared from a polyol(allyl carbonate) homopolymer, e.g., homopolymers of diethylene glycol bis(allyl carbonate), at the same ambient temperatures.

19 Claims, No Drawings

POLYMERIZABLE ORGANIC RESIN COMPOSITION

CROSS REFERENCE TO RELATED APPLICATIONS

This application is a division of U.S. Ser. No. 07/339,850, filed Apr. 18, 1989, now U.S. Pat. No. 4,994,208.

DESCRIPTION OF THE INVENTION

The present invention relates to articles prepared from synthetic organic resins, which articles have organic photochromic material(s) applied to or incorporated therein. More particularly, the present invention relates to certain polyol(allyl carbonate) compositions and to photochromic articles prepared from such compositions. Such photochromic articles are characterized by an improved photochromic equilibrium response at ambient temperatures compared to photochromic articles prepared from homopolymers of polyol(allyl carbonate) comonomer, e.g., homopolymers of diethylene glycol bis(allyl carbonate), i.e., these novel photochromic articles darken more at equilibrium at any ambient temperature.

Photochromism is a phenomenon involving the change in color of a photochromic substance (or an article containing such a substance) when it is exposed to light radiation involving ultraviolet rays, such as ultraviolet radiation contained in sunlight or in the light of a mercury lamp, and the return to the original color when the influence of the ultraviolet radiation is discontinued, e.g., by storing the substance (or article) in the dark or removing the source of ultraviolet radiation. In recent years, photochromic plastic materials, particularly plastic materials for optical applications, have been the subject of considerable attention. In particular, photochromic ophthalmic plastic lenses have been investigated because of the weight advantage they offer, vis a vis, glass lenses. Moreover, photochromic transparencies for vehicles, such as cars and airplanes, have been of interest because of the potential safety features that such transparencies offer.

When incorporated within the matrix of a synthetic organic resin transparency (or applied to a substrate of such matrix), a photochromic substance changes color when exposed to ultraviolet light. This change in color reduces the amount of light transmitted through the transparency. It is desirable that the equilibrium response of the photochromic substance-containing transparency at all normal ambient temperatures, including relatively high ambient temperatures, e.g., temperatures on the order of 95° C., be significant.

It is reported that a photochromic substance, e.g., a photochromic compound, converts to its colored form by absorption of light radiation involving the near ultraviolet portion of the spectrum, i.e., the so-called coloring reaction. It is reported also that a reverse reaction occurs simultaneously in which the colored form reverts to the colorless (or original color) form as a result of exposure to white light and/or the action of heat, i.e., the so-called bleaching reaction. The rate of bleaching due to heat (thermal fade) increases with increasing temperature. At relatively high ambient temperatures, e.g., 95° F., the rate of thermal fade can become significant and, as a consequence, the photochromic substance does not develop a sufficiently intense color, i.e., the luminous transmission of a transparency at such temperatures is significantly larger than at lower temperatures, e.g., 55°-75° F. Stated conversely, the activated color of the photochromic transparency is lighter at high ambient temperatures than at lower ambient temperatures.

It has now been discovered that photochromic articles e.g., transparencies, prepared from certain polymerizable polyol(allyl carbonate) compositions exhibit an improved photochromic equilibrium response compared to photochromic articles prepared from homopolymers of a polyol(allyl carbonate), such as diethylene glycol (bis allyl carbonate). This improved equilibrium response can be observed at temperatures of from 0° F. to 115° F., e.g., from 30° F. to 100° F., particularly over an ambient temperature range from about 55° F. to about 95° F. Such improvement in the photochromic response is believed to be a result of an improvement in the coloring efficiency, i.e., the efficiency of the so-called coloring reaction, in such polyol(allyl carbonate) compositions. More particularly, said certain polyol(allyl carbonate) compositions comprise a mixture of a major amount of a polyol(allyl carbonate), e.g., diethylene glycol bis(allyl carbonate), and a minor amount of a polyurethane containing ethylenic unsaturation, e.g., acrylic functional groups, at its terminal ends. Optionally, a small amount of a copolymerizable difunctional monomer, such as allyl methacrylate, may be added to the composition to enhance the hardness of the polymerizate prepared from the polyol(allyl carbonate) composition.

DETAILED DESCRIPTION OF THE INVENTION

Various synthetic organic resins have been proposed for use as a matrix for organic photochromic substances. Among such resins are homopolymers of polyol(ally carbonate) monomers, polyacrylates, polycarbonates and polyurethanes. See, for example, U.S. Pat. No. 4,637,698 (column 3, lines 4-16). U.S. Pat. No. 3,565,814 describes incorporating benzospiropyran compounds into poly(lauryl methacrylate). European Patent Application 227,337 proposes a direct casting process for manufacturing a shaped synthetic plastic article having photochromic properties by incorporating a photochromic spirooxazine compound into a mixture containing a highly reactive polyfunctional monomer, e.g., ethylene glycol dimethyacrylate or diacrylate. Japanese Patent Publication 62/11,743 describes a photochromic article prepared from a resin characterized by a well-developed three-dimensional crosslinked structure obtained by polymerizing a polyfunctional monomer or monomer composition containing at least 30 weight percent of a polyfunctional monomer, e.g., ethylene glycol dimethyacrylate.

U.S. Pat. No. 4,360,653 describes polymerizates of blends of aliphatic polyol(allyl carbonate) and a polyurethane having terminal diacrylate functionality in order to increase impact strength of the polymerizate without increasing yellowing. Such polymerizates are prepared by polymerization of a blend of the polyol(allyl carbonate) and diacrylate terminated polyurethane with from about 3-3.5 weight percent of a free radical initiator, e.g., diisopropyl peroxydicarbonate, [based on the polyol(allyl carbonate)] to achieve a hard impact resistant polymer. The preferred blend is one containing from 80 to 90 percent diethylene glycol bis(allyl carbonate), and the balance diacrylate terminated polyurethane having a weight average molecular weight of between about 1,300 and about 1,500. However, the patentees do not recognize that a photochromic substance(s) may be incorporated in the polymer resin matrix of some polymerizates of the type described and that such photochromic articles will exhibit an improved photochromic equilibrium response.

In accordance with the present invention, there is provided a photochromic article comprising a solid synthetic organic resin matrix prepared from certain polymerizable polyol(allyl carbonate) compositions and a photochromic amount of an organic photochromic substance. The polymerizable polyol(allyl carbonate) composition used to prepare the resin matrix is a liquid material of a blend of copolymerizable monomeric materials; namely, polyol(allyl carbonate) monomer, aliphatic polyurethane having ethylenic unsaturation at its terminal ends, and optionally a difunctional monomer selected from the group consisting of allyl methacrylate and allyl acrylate. More particularly, the polymerizable polyol(allyl carbonate) monomer represents from about 55 to about 90 weight percent, preferably from about 60 to about 80, e.g., about 70, weight percent of the copolymerizable composition.

Polyol(allyl carbonate) monomers that may be used in the aforedescribed polymerizable composition are allyl carbonates of linear or branched aliphatic or aromatic liquid polyols, e.g., aliphatic glycol bis(allyl carbonate) compounds, or alkylidene bisphenol bis(allyl carbonate) compounds. These monomers may be described as unsaturated polycarbonates of polyols, e.g., glycols. The monomers may be prepared by procedures well known in the art, e.g., as described in U.S. Pat. Nos. 2,370,567 and 2,403,113.

Polyol(allyl carbonate) monomers may be represented by the graphic formula:

$$R'-[-O-C(O)-O-R]_m \qquad \text{I}$$

wherein R is the radical derived from an unsaturated alcohol and is commonly an allyl or substituted allyl group, R' is the radical derived from the polyol and m is a whole number from 2–5, preferably 2. The allyl group may be substituted at the 2-position with a halogen, most notably chlorine or bromine, or an alkyl group containing from 1 to 4 carbon atoms. Generally the alkyl substituent is a methyl or ethyl group. The allyl group may be represented by the graphic formula:

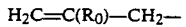

$$H_2C=C(R_0)-CH_2- \qquad \text{II}$$

wherein $R_0$ is hydrogen, halogen or a $C_1$–$C_4$ alkyl group. Most commonly, R is the ally group, $H_2C=CH-CH_2-$.

R' is a polyvalent radical derived from the polyol which can be an aliphatic or aromatic polyol that contains 2, 3, 4 or 5 hydroxy groups. Typically, the polyol contains 2 hydroxy group, i.e., a glycol or bisphenol. The aliphatic polyol may be linear or branched and contain from 2 to 10 carbon atoms. Commonly, the aliphatic polyol is an alkylene glycol having from 2 to 4 carbon atoms or poly($C_2$–$C_4$) alkylene glycol, e.g., ethylene glycol, propylene glycol, trimethylene glycol, tetramethylene glycol, or diethylene glycol, triethylene glycol, etc.

Specific examples of polyol(allyl carbonate) monomers include ethylene glycol bis(2-chloroallyl carbonate), ethylene glycol bis(allyl carbonate), diethylene glycol bis(2-methallyl carbonate), diethylene glycol bis(allyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4-butanediol bis(2-bromoallyl carbonate), dipropylene glycol bis(allyl carbonate), trimethylene glycol bis(2-ethylallyl carbonate), pentamethylene glycol bis(allyl carbonate), and isopropylidene bisphenol bis(allyl carbonate). Diethylene glycol bis(allyl carbonate) is the preferred polyol(allyl carbonate) monomer.

A detailed description of polyol(allyl carbonate) monomers that may be used to form the polyol(allyl carbonate) composition of the present invention are described in U.S. Pat. No. 4,637,698 at column 3, line 33 through column 5, line 61. That disclosure is hereby incorporated by reference and is summarized above. As used in the present description and claims, the term polyol(allyl carbonate) monomer or like names, e.g., diethylene glycol bis(allyl carbonate), are intended to mean and include the named monomer or prepolymers thereof and any related monomers species contained therein.

The polyol(allyl carbonate) composition of the present invention may contain from about 10 to about 40 weight percent of an aliphatic polyurethane having terminal ethylenic unsaturation, e.g., an aliphatic polyurethane diacrylate or triacrylate. In a preferred embodiment of the present invention, the composition contains from about 20 to about 30 weight percent of the aliphatic polyurethane, which may be represented by the expression:

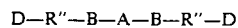

$$D-R''-B-A-B-R''-D \qquad \text{III}$$

wherein D represents the terminal functional group containing ethylenic unsaturation, R'' represents a bivalent alkylene group containing from 1 to about 10 carton atoms, B represents an aliphatic bis carbamate moiety originating from the corresponding aliphatic diisocyanate, and A represents the residue of a saturated aliphatic polyol, e.g., diol, e.g., a $C_2$–$C_6$ alkane diol, a polyether diol, a polycarbonate diol or a polyester diol. Preferably, A is a polyester diol. The polyurethane should form a homogeneous mixture in and be copolymerizable with the polyol(allyl carbonate), e.g., diethylene glycol bis(allyl carbonate), with which it is blended.

The terminal functional group containing ethylenic unsaturation (D) is typically selected from members of the group acrylate, methacrylate, allyl carbamate and allyl carbonate. The acrylate and methacrylate functional groups may be represented by the formula, $CH_2=C(R_1)-C(O)O-$, wherein $R_1$ is hydrogen or methyl. The allyl carbamates and carbonates may be represented by the formulae, $CH_2=CH-CH_2-NH-C(O)O-$, and $CH_2=CH-CH_2-O-(O)O-$, respectively.

The group R'' in formula III represents a bivalent $C_1$–$C_{10}$ alkylene, including branched and straight chain alkylenes. Most commonly, R'' is a bivalent $C_2$–$C_4$ alkylene, e.g., ethylene ($-CH_2CH_2-$).

Diisocyanates that may be used to prepare the aliphatic polyurethane component of the polyol(allyl carbonate) composition are aliphatic diisocyanates and cycloaliphatic diisocyanates. For convenience and brevity, such isocyanates will be referred to collectively as aliphatic diisocyanates. Such materials are substantially free of aromatic moieties. By substantially free of aromatic moieties is meant that the aliphatic diisocyanate (and thus the aliphatic polyurethane component)

contains 1 percent or less of aromatic diisocyanate groups. Examples of suitable diisocyanates include 1,6-hexamethylene diisocyanate, 1,4-tetramethylene diisocyanate and 1,10-decamethylene diisocyanate, 4,4'-methylene-bis(cyclohexyl isocyanate), 4,4'-methylene-bis(3-methyl cyclohexyl isocyanate), hydrogenated toluene diisocyanate (including hydrogenated products of: (a) the 2,4-isomer, (b) the 2,6-isomer, (c) the 80/20-2,4/2,6-isomer mixture and (d) the 65/35-2,4/2,6-isomer mixture), 4,4'-isopropylidene-bis(cyclohexyl isocyanate), 1,4-cyclohexane diisocyanate, 4,4'-dicyclohexyl diisocyanate, 4,4'-dicyclohexyl diisocyanate and 3-isocyanatomethyl-3,5,5-trimethylcyclohexane diisocyanate. The group B in formula III may originate from such aliphatic diisocyanates.

In formula III, A represents the residue of a saturated aliphatic diol, such as alkane diols containing from 2 to 6, e.g., 2 to 4, carbon atoms, polyether diols, polycarbonate diols and polyester diols.

Polyester diols may be prepared by techniques well-known in the art, e.g., using saturated dicarboxylic acids or anhydrides thereof (or combination of acids and anhydrides) and polyhydric alcohols, or by ring opening of caprolactones, e.g., epsilon caprolactone. Such polyester diols and their manner of preparation are well known and are fully described in the published literature. Many are commercially available in various molecular weights. Aliphatic dicarboxylic acids suitable for preparing polyesters are those containing from about 4 to about 14, preferably from about 6 to about 10, carbon atoms inclusive. Examples of such dicarboxylic acids include: succinic acid, glutaric acid, adipic acid, pimelic acid, suberic acid, azelaic aid and sebacic acid. Corresponding anhydrides can also be used. Typically, adipic and azelaic acids are used.

The polyhydric alcohols used in the preparation of polyester diols are typically aliphatic alcohols containing at least 2 hydroxy groups, e.g., straight chain glycols containing from 2 to 15, preferably from 4 to 8, carbon atoms inclusive. More preferably, the aliphatic alcohols contain only 2 hydroxy groups. The glycols contain hydroxyl groups preferably in the terminal positions. Examples of such polyhydric alcohols include ethylene glycol, diethylene glycol, triethylene glycol, tetraethylene glycol, 1,3-propane diol, 1,3-butane diol, 1,4-butane diol, 1,5-pentane diol, 2,2-dimethylpropane diol, 1,5-hexane diol, 1,7-heptane diol, 1,8-octane diol, 1,10-decane diol and mixtures of such polyhydric alcohols.

In preparing the polyester diol, the dicarboxylic acid (or anhydride thereof) is reacted with the polyhydric alcohol usually in the presence of a small amount of esterification catalyst, such as a conventional organo tin catalyst. The amount of acid and alcohol used will vary and depend on the molecular weight polyester desired. Hydroxy terminated polyesters are obtained by utilizing an excess of the alcohol, thereby to obtain linear chains containing a preponderance of terminal hydroxyl groups. Examples of polyesters include: poly(1,4-butylene adipate), poly)1,4-butylene succinate), poly(1,4-butylene glutarate), poly(1,4-butylene pimelate), poly(1,4-butylene suberate), poly(1,4-butylene azelate), poly(1,4butylene sebacate) and poly(epsilon caprolactone). Polyester diols contemplated for use may have a weight average molecular weight from about 500 to about 3000, e.g., from about 500 to 2500, more particularly from about 900 to about 1300.

Polycarbonate diols that may be used to prepare the aliphatic polyurethane component of the polyol (allyl carbonate) composition may have weight average molecular weights ranging from about 500 to about 5000, e.g., 550 to 3300, more particularly from 750 to 1500, as determined by hydroxyl end group analysis. Aliphatic polycarbonate diols are described in U.S. Pat. Nos. 3,248,414, 3,248,415, 3,248,416, 3,186,961, 3,215,668, 3,764,457, and 4,160,853. Such hydroxy-terminated polycarbonates may be prepared from (1) carbon dioxide and 1,2-epoxides, (2) cyclic carbonates, such as ethylene carbonate, or (3) from cyclic carbonates and 1,2-epoxides by methods known in the art. Polycarbonate diols may also be prepared by reacting aliphatic diols with bischloroformates of aliphatic diols in the presence of inert solvents and acid acceptors, e.g., tertiary amines. In addition, polycarbonate diols may be prepared from glycols, such as ethylene glycol, propylene glycol and diethylene glycol, and dialkyl carbonates, such as diethyl carbonate and dimethyl carbonate, by a transesterification reaction.

In particular, U.S. Pat. No. 4,160,853 describes the synthesis of aliphatic polycarbonate diols by the reaction of an aliphatic diol and a dialkyl carbonate in the presence of a titanium catalyst. The reaction sequence may be depicted by the following equation:

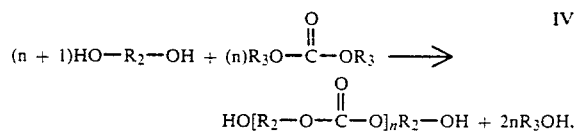

wherein n is a number from 4 to 46, $R_2$ is an aliphatic group (linear or cycloaliphatic) containing from 4 to about 10 carbon atoms, and $R_3$ is a lower alkyl group containing 1 to 4 carbon atoms. Preferred aliphatic diols include: 1,4-butane diol, and 1,6-hexane diol. Diethylcarbonate is a preferred dialkyl carbonate. The preferred catalysts are tetra-alkyl esters of titanium, particularly, tetrabutyl titanate. The disclosures of the aforedescribed patents relating to the preparation of aliphatic polycarbonate diols are hereby incorporated by reference.

Polyether diols, e.g., poly(oxyethylene)glycols, poly(oxy-1,2-propylene)glycols, and poly(oxy-1,4-butylene)glycol, that may be used to prepare the aliphatic polyurethane component of the polyol(allyl carbonate) composition may also vary in molecular weight. Poly)oxyethylene)glycols may range in molecular weight from about 200–4000, more particularly, 750–3300, e.g., 1000–2800. Liquid poly(oxyethylene)glycols having molecular weights of below about 750, as determined by hydroxyl end group analysis, are particularly contemplated. Poly(oxyethylene)glycols may be prepared by reaction of ethylene oxide with water or ethylene glycol in the presence of a catalytic amount of a Lewis acid at 50°–70° C. or Lewis base at 120°–200° C.

Poly(oxypropylene)glycols may be prepared in a manner similar to poly(oxyethylene)glycols. Molecular weights of the poly(oxypropylene)glycols that may be used to prepare the polyol(allyl carbonate) composition may vary from about 400 to about 4000, e.g., 400 to about 2000, or 400 to about 1200, as determined by hydroxyl end group analysis. Liquid poly(oxypropylene)glycols are particularly contemplated.

In addition, block and random hydroxyl terminated copolymers of ethylene oxide and propylene oxide may be used. Further, polyether diols prepared from 1,2-butylene oxide, i.e., poly(oxy-1,2-butylene)glycol, and tetrahydrofuran are also contemplated. Alkane diols contemplated for use in preparing the polymerizable polyol (allyl carbonate) composition are alkane diols containing from 2 to 6 carbon atoms, e.g., ethylene glycol, propylene glycol, 1,4-butane diol, 1,5-pentane diol and 1,6-hexane diol. Preferably, the alkane diols contain terminal hydroxy groups.

The aliphatic polyurethane may be prepared by methods well documented in the literature and known to those skilled in the art, e.g., by reacting an excess of the aliphatic diisocyanate with the saturated aliphatic diol, e.g., polyester diol, thereby to from the corresponding urethane having terminal isocyanate functionality. Thereafter, the resulting urethane diisocyanate may be reacted with a material having acrylic (or allylic) and hydroxyl functionality, e.g., a monoacrylate of a diol, e.g., 2-hydroxyethyl acrylate, to prepare the aliphatic urethane having terminal functional groups containing ethylenic unsaturation. As used herein, the phrase "containing terminal ethylenic unsaturation" with respect to the aliphatic polyurethane means that each terminal end of the urethane contains a functional group containing ethylenic unsaturation, e.g., diacrylate functionality. Diacrylate-terminated polyester-based polyurethanes are commercially available in various molecular weights. Of particular utility is the commercial polyesterurethane, Uvithane ® 893 urethane diacrylate.

Polyesterurethanes containing terminal acrylate functionality may be further depicted by the following graphic formula:

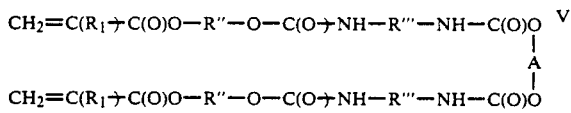

wherein $R_1$, $R''$ have the same meaning as described hereinabove, A is the residue of the polyester diol, and $R'''$ is the hydrocarbon portion of the aliphatic diisocyanate. Polyesterurethanes having terminal allyl carbamate or allyl carbonate groups may be depicted similarly by substituting the allyl carbamate or allyl carbonate group for the acrylate functional group in graphic formula IV, i.e., for the $CH_2=C(R_1)—C(O)O—$ group.

In a further embodiment of the present invention, a difunctional copolymerizable monomer is capable of enhancing cross-linking of the copolymerized polyol(allyl carbonate) and aliphatic polyurethane components of the polymerizable composition is incorporated in such composition. The addition of the difunctional monomer enhances development of a three-dimensional cross-linked structure in the polymerizate which increases the polymerizate's hardness. Typically, from about 0 to about 5 weight percent, more typically from about 1 to about 4, e.g., about 1.5 to 2, weight percent, based on the total weight of the polymerizable polyol(allyl carbonate) composition, of difunctional monomer may be incorporated in the polymerizable composition. Customarily, the difunctional monomer is allyl methacrylate or allyl acrylate.

Polymerization of the poly(allyl carbonate) composition may be accomplished by adding to the composition an initiating amount of material capable of generating free radicals, such as organic peroxy compounds and diazo compounds. Methods for polymerizing polyol(allyl carbonate) compositions are well known to the skilled artisan and any of those well known techniques may be used to polymerize the aforedescribed polymerizable composition. Suitable examples of organic peroxy compounds include: peroxymonocarbonate esters, such as tertiarybutylperoxy isopropyl carbonate; peroxydicarbonate esters, such as di(2-ethylhexyl) peroxydicarbonate, di(secondary butyl) peroxy dicarbonate and diisopropyl peroxydicarbonate; diacylperoxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters such as t-butylperoxy pivalate, t-butylperoxy octylate, and t-butylperoxyisobutyrate; methylethylketone peroxide, acetylcyclohexane sulfonyl peroxide, and azobisisobutyronitrile. Preferred initiators are those that do not discolor the resulting resin polymerizate, such as diisopropyl peroxydicarbonate.

The amount of initiator used to initiate and polymerize the polyol(allyl carbonate) composition may vary and will depend on the particular initiation used. Only that amount that is required to initiate and sustain the polymerizable reaction is required, i.e., an initiating amount. With respect to the preferred peroxy compound, diisopropyl peroxydicarbonate, typically between about 2 and about 3 parts of that initiator per 100 parts of the polymerizable composition (phm) may be used. More usually, between about 2.25 and about 2.60 parts of that initiator per 100 parts of polymerizable composition is used to prepare the polymerizate of the present invention. The amount of initiator and the consequent cure cycle should be adequate to produce a polymerizate having a 15 second Barcol hardness of at least 10, preferably, at least 12, e.g., 10 to 35. Typically, the cure cycle involves heating the polymerizable composition in the presence of the initiator from room temperature to about 105° C. over a period of about 17 hours. The surface of the cured matrix should not be so hard that imbibition of photochromic substances into the matrix by immersion or thermal transfer is inhibited or prevented if that method of incorporating the photochromic substance is used. In one embodiment, the matrix is slightly undercured to enhance permeation of the photochromic substance into the matrix.

Various additives may be incorporated with the polymerizable polyol(allyl carbonate) composition. Such additives may include light stabilizers, heat stabilizers and ultraviolet light absorbers. Examples of such stabilizers include hydroquinone monomethylether, which may be added to the polymerizable composition in amounts of about 250 parts per 100 parts of polymerizable resin, and amine and phosphite type stabilizers each in amounts of less than about 0.2 weight percent, based on the weight of the polymerizable resin composition. In addition, it is contemplated that a form of photochromic substance resistant to the effects of the peroxy-type initiator may also be added to the polymerizable resin composition. Such photochromic substances include photochromic pigments and photochromic compounds encapsulated in metal oxides, the latter of which is such as described in U.S. Pat. Nos. 4,166,043 and 4,367,170.

The synthetic organic resin matrix obtained by polymerization of the polyol(allyl carbonate) composition will preferably be transparent or optically clear so that the matrix may be used for optical lenses, such as plano and ophthalmic lenses, windows, automative transparencies, e.g., windshields, T-roofs, sidelights and backlights, and for aircraft transparencies, etc. The resin matrix should be transparent to that portion of the electromagnetic spectrum which activates the photochromic substance(s) incorporated in the matrix, i.e., that wavelength of ultraviolet (UV) light that produces the colored or open form of a photochromic substance and that portion of the visible spectrum that includes the absorption maximum wavelength of the photochromic substance in its V activated form, i.e., the open form.

Since the polymerizable polyol(allyl carbonate) composition is from about 55 to 90 weight percent polyol(allyl carbonate) the physical properties of the cured (polymerized) organic resin matrix of the present invention are similar to those obtained for homopolymers of polyol(allyl carbonate) monomer, e.g., diethylene glycol bis(allyl carbonate). For optical applications, such properties include relatively low yellowness, low haze, adequate impact strength and hardness, suitable abrasion resistance for polymerizates of polyol(allyl carbonate), dyeability and organic solvent resistance. Such physical properties are described in "The Handbook of Plastic Optics", second edition, U.S. Precision Lens, Inc., Cincinnati, Ohio, 1983, which is incorporated herein by reference.

Photochromic articles described herein may be obtained by incorporating in or applying to the aforedescribed synthetic organic resin solid matrix at least one organic photochromic compound or compositions containing at least one organic photochromic compound (hereinafter collectively referred to as "photochromic substance(s)"). Incorporation or application of a photochromic substance to the matrix may be accomplished by various methods described in the art. Such methods include dissolving or dispersing the photochromic substance within the matrix, e.g., imbibition of the photochromic substance into the matrix by immersion of the matrix in a hot solution o the substance or by thermal transfer; providing the photochromic substance as a separate layer between adjacent layers of the polymeric matrix, e.g., as part of the polymer film; and applying the photochromic substance as part of a coating placed on the surface of the matrix. The term "imbibition" or "imbibe" is intended to mean and include permeation of the photochromic substance alone into the subsurface of the matrix, solvent assisted transfer absorption of the photochromic substance into a porous polymer matrix, vapor phase transfer and other such transfer mechanisms. For example:

(a) The photochromic substance may be mixed with a polymerizable composition that, upon curing, produces a polymeric host material and the polymerizable composition cast as a film, sheet or lens, injection molded or otherwise formed into a sheet or lens, or polymerized by emulsion or suspension polymerization to form a photochromic particulate material that may be used as a pigment;

(b) The photochromic substance may be dissolved or dispersed in water, alcohol or other solvents or solvent mixtures and then imbibed into the solid host material by immersion of the solid host material for from several minutes to several hours, e.g., 2-3 minutes to 2-4 hours, in a bath of such solution or dispersion. The bath is conventionally at an elevated temperature, usually in the range of 50°-120° C.; however, higher temperatures may be used. Thereafter, the host material is removed from the bath and dried;

(c) The photochromic substances may also be applied to the surface of the host material by any convenient manner, such as spraying, brushing, spin-coating or dip-coating from a solution or dispersion of the photochromic substance in the presence of a polymeric binder. Thereafter, the photochromic substance is imbibed into the host material by heating it, e.g., in an oven, for from a minute to several hours, e.g., 2 to 3 hours, at temperatures in the range of from 80°-180° C., e.g., 100°-150° C.

(d) In a variation of the preceding imbibition procedure, the photochromic substance may be deposited onto or absorbed by a temporary support, e.g., a sheet of kraft paper, aluminum foil, polymer film or fabric, which is then placed in near proximity to or in contact with the host material and heated, e.g., in an oven. This and the preceding procedure may be repeated one or more times to imbibe the desired amount of photochromic substance into the host material;

(e) The photochromic substance may be dissolved or dispersed in a transparent polymeric material which may be applied to the surface of the host in the form of an adherent film by any suitable technique such as spraying, brushing, spin-coating or dip-coating; and finally (f) The photochromic substance may be incorporated in or applied to a transparent polymeric material by any of the above-mentioned methods, which can then be placed within the host material as a discrete layer intermediate to adjacent layers of the host material(s).

In addition, imbibition of photochromic substances into a host material may be accomplished by the method described in U.K. Patent Application 2,174,711, which is hereby incorporated in toto by reference. In that method, a substantially mottle-free, substantially homogeneous film of polymeric resin having the photochromic substance dissolved therein is applied to the surface of the host material. The film-bearing host material is heated to temperatures near to but below the melting temperature of the photochromic substance for a time sufficient to incorporate a photochromic amount of the photochromic substance into the surface of the host. The photochromic-depleted film is then removed from the host surface with a suitable solvent.

Imbibition of photochromic substances into a host material, e.g., an ophthalmic lens, may be performed also by dissolving the photochromic substance in a suitable solvent, e.g., toluene, and absorbing the resulting solution into a temporary substrate, such as filter paper or other substrates described in subparagraph (d) hereinabove. The temporary substrate may be a flexible material that can take the shape of the surface of the host material on which it is placed if such surface is irregular or not flat, such as the curved surface of the lens.

The temporary substrate containing the solution of photochromic substances is dried to remove the solvent and the substrate placed in contact with the surface of the host material. Optionally, a metal cap having the shape of the host material surface is placed on top of the substrate to insure uniform contact of the interface of the substrate and host surface. For example, when the host is a lens, the cap and temporary substrate should be shaped to conform to the shape of the lens, e.g., the convex or concave surface of the lens. This sandwich comprising the metal cap-temporary substrate-host material is then heated for a time sufficient to imbibe a photochromic amount of the photochromic substance(s) into the substrate of the host material. Heating times may range from about 15 minutes to 180 minutes, usually from 45 to 120 minutes at transfer temperatures, which may range from 125° C. to 155° C.

The aforesaid process may be repeated one or more times, e.g., two or three times, to imbibe the desired amount of photochromic substance into the subsurface of the host material, e.g., to a depth beneath the surface of up to about 150 microns. In the case of semi-finished lenses, the imbibition process is performed on the front (convex) surface of the lens to allow finishing (grinding) of the back (concave) surface. Further, the edges of the lens may be ground to remove imperfections before thermally transferring the photochromic substances. If desired, the host material may then be tinted with a color compatible dye e.g., a brown, yellow-brown or gray dye.

Compatible (chemically and color-wise) tints, e.g, dyes, may be applied to the host material to achieve a more aesthetic result, for medical reasons, or for reasons of fashion. The particular dye selected will vary and depend on the aforesaid need and result to be achieved. In one embodiment, the dye may be selected to complement the color resulting from the activated photochromic substances, e.g., to achieve a more neutral color or absorb a particular wavelength of incident light in another embodiment, the dye may be selected to provide a desired hue to the host matrix when the photochromic substance is in an unactivated state.

Typically, tinting is accomplished by immersion of the host material in a heated aqueous dispersion of the selected dye. The degree of tint is controlled by the temperature of the dye bath and the length of time the host material is allowed to remain in the bath. Generally, the dye bath is at temperature of less than 100° C., e.g., from 70° C. to 90° C., such as 80° C., and the host material remains in the bath for less than five (5) minutes, e.g., between about 0.5 and 3 minutes, e.g., about 2 minutes. The degree of tint is such that the resulting article usually exhibits from about 70 to about 85 percent, e.g., 80-82 percent, light transmission.

Adjuvant materials may also be incorporated into the host material with the photochromic substances prior to, simultaneously with or subsequent to application or incorporation of the photochromic substances in the host material. For example, ultraviolet light absorbers may be admixed with photochromic substances before their application to the host material or such absorbers may be superposed, e.g., superimposed, as a layer between the photochromic substance and the incident light. Further, stabilizers may be admixed with the photochromic substances prior to their application to the host material to improve the light fatigue resistance of the photochromic substances. Stabilizers, such a hindered amine light stabilizers and singlet oxygen quenchers, e.g., as a nickel ion complex with an organic ligand, are contemplated. They may be used alone or in combination. Such stabilizers are described in U.S. Pat. No. 4,720,356. Finally, appropriate protective coating(s), such as abrasion resistant coatings, may be applied to the surface of the host material. Such coatings are known in the art.

The amount of photochromic substance(s) incorporated into the synthetic resin matrix may vary and will depend on the method of incorporation. Typically, a sufficient amount, i.e., a "photochromic amount", of the photochromic substance(s) is added to the matrix so that the resulting article is photochromic, i.e., produces a photochromic effect. By "photochromic" or "photochromic effect" is meant that when the photochromic-containing matrix is exposed to ultraviolet light, the matrix visibly changes color (or becomes colored) and then returns to its original color or colorless state when the ultraviolet light is removed. The photochromic effect may be readily observed by exposing such matrix to a source of natural ultraviolet light, such as the sun, or to an artificial ultraviolet light source, such as a Spectroline Super ® Lamp, Model M ENF-b 28 (365 nanometers). Generally, the amount of photochromic substance(s) incorporated into the matrix may vary from about 0.01 to about 10 or 20 weight percent. More typically, the amount of photochromic substance(s) incorporated into the matrix may range from about 0.01 to about 2 weight percent, e.g., from about 0.05 to about 1 weight percent.

Photochromic substances that may be used to prepare the photochromic article of the present invention may be any suitable organic photochromic substance that provides a visual photochromic response when incorporated into the resin matrix described herein; that are dispersible, e.g., soluble, within the resin matrix, and that are chemically compatible with resin. Thus, photochromic substances that may be used are varied. Particularly contemplated classes of photochromic compounds that may be used include: spiro(indolino)-type compounds, such as spiro(indolino)pyridobenzoxazines, spiro(indolino)naphthoxazines, spiro(benzindolino)-pyridobenzoxazines, spiro(benzindolino)naphthoxazines, spiro(benzindolino)naphthopyrans, spiro(indolino)benzopyrans, spiro(indolino)naphthopyrans, spiro(indolino)quinopyrans. spiro(indolino)benzoxazines, chromenes, i.e., benzopyrans and naphthopyrans, metal dithizonate compounds, fulgides or fulgimides and spiro(di)hydroindolizines.

The particular photochromic substance(s) selected for use will depend on its compatibility with the resin, including its solubility therein, and the particularly change in color desired for the photochromic article. It is also contemplated that mixtures of two or more photochromic substances may be used.

Photochromic compounds that may be utilized to prepare photochromic articles of the present invention are for the most part described in the open literature and are the subject of the various patent publications. For example, spiro(indolino)naphthoxazines have been described, among others, in U.S. Pat. Nos. 3,562,172, 3,578,602, 4,215,01 and 4,342,668. Spiro(indolino)-pyridobenzoxazines are described in U.S. Pat. No. 4,637,698. Spiro(benzindolino)pyridobenzoxazines and spiro(benzindolino)naphthoxazines are described in U.S. Pat. No. 4,931,219. Spiro(benzindolino)naphthopyrans are described in Japanese patent publication 62/195383. Spiro(indolino)benzoxazines are described in International patent publication W088/02371. Spiro-(indolino)benzopyrans, spiro(indolino)naphthopyrans and spiro(indolino)quinopyrans are described, for example, in U.K. patent publication 2,174,711. Spiropyrans are also described in the text, *Techniques of Chemistry*, Volume III Photochromism, Chapter 3, Glenn H. Brown, Editor, John Wiley and Sons, Inc. New York 1971.

Photochromic organo-metal dithizonates, i.e., (arylazo)thioformic arylhydrazidates, e.g., mercury dithizonates, are described in, for example, U.S. Pat. No. 3,361,706. Fulgides and fulgimides, e.g. the 3-furyl and 3-thienyl fulgides and fulgimides are described in U.S.

Pat. No. 4,220,708. 3-pyrryl fulgides and fulgimides are described in British patent publication 2,170,202. Spiro(dihydroindolizines are described, for example, in West German Patents DE 3,320,077, 3,220,257 and 2,906,193. Certain chromenes, i.e., benzopyrans and naphthopyrans, are described in U.S. Pat. No. 3,567,605 and European patent publication 246,114.

Those portions of the aforementioned identified patent publications and applications that described the various photochromic compounds generically and specifically are hereby incorporated in toto by reference. In particular, pages 13-37 of International patent Application PCT/US88/04176, which describes specific spiro(indolino)-type photochromic compounds and other photochromic compounds and the disclosure relating thereto is incorporated herein in toto by reference.

The present invention is more particularly described in the following examples, which are intended as illustrative only, since numerous modifications and variations therein will be apparent to those skilled in the art.

EXAMPLE 1

A polyol(allyl carbonate) polymerizable composition of about 68.5 weight percent diethylene glycol bis(allyl carbonate), about 30 percent of Uvithane ® 893 urethane diacrylate and about 1.5 percent allyl methacrylate was mixed with about 2.4 phm (parts per hundred parts of monomer) of diisopropyl peroxydicarbonate and poured into a mold prepared from flat glass plates separated by a ⅛ inch (0.138 centimeter) gasket. The polymerizable composition was cured anaerobically by heating the composition slowly from about 44° C. to 105° C. over 17 hours. The cured sheet had a 15 second Barcol hardness of greater than 10 and was measured with a Barcol Impressor Model GYZJ 934-1 (Barber-Coleman Co.). The cured cast sheet was cut into 2 inch (5.1 centimeter)×2 inch (5.1 centimeter) square coupons for subsequent use.

The spiro(indolino)benzoxazine, 5,7-dimethoxy 1',3',4'(and 6') 5'-tetramethyl-3'-ethylspiro[2H-1,4-benzoxazine-2-2'-indoline], was imbibed into the blank surface of one of the aforesaid square coupons in the following manner: A 2 inch (5.1 centimeter) square sheet of Whatman No. 4 filter paper was saturated with a 10 weight percent solution of the spiro(indolino) benzoxazine in toluene. The filter paper was air dried until free of toluene, and then placed on the test coupon. The test coupon and filter paper were placed between two aluminum plates (0.125 inches×2.25 inches=2.25 inches−0.318 centimeters×5.72 centimeters×5.72 centimeters) and the resulting assembly heated to about 130°-135° C. for about 90 minutes. After cooling and separation from the assembly, the surface of the cooled test coupon was cleaned with acetone and the aforedescribed imbibition process repeated with a fresh sample of saturated filter paper.

Under temperature controlled conditions of 50° F. (10° C.), 72° F. (22° C.) and 95° F. (35° C.) the aforesaid test coupon was irradiated with light from a Xenon Arc Solar Simulator (Oriel Model 81172) until the equilibrium luminous transmission was achieved. The transmissions and color coordinates of the coupon were determined on a color spectrometer (Spectroguard II). Data obtained is tabulated in Table I as Example 1-A. The aforedescribed procedure was repeated with the spiro(indolino)benzoxazine, 5,7-dimethoxy-1'-n-propyl-3'-methyl-3'-ethyl-5'-methoxy spiro[2H-1,4-benzoxazine-2,2'-indoline], and the data reported in Table I as Example 1-B.

The aforedescribed procedure was repeated with the spiro(indolino)benzoxazine, 5,7-dimethoxy-1'-n-propyl-3',5'-dimethyl-3'-ethyl spiro[2H-1,4-benzoxazine-2,2'-indoline], and the data reported in Table I as Example I-C.

The aforedescribed procedure was repeated with the spiro(indolino)benzoxazine, 5,7-dimethoxy-1'-n-propyl-3',4' (and 6'),5'-trimethyl-3'-ethyl spiro[2H-1,4-benzoxazine-2,2'-indoline[, and the data reported in Table I as Example I-D.

Each of the described spiro(indolino)benzoxazines were imbibed into the respective test coupons to achieve a substantially equal concentration of the photochromic benzoxazine compounds in the respective coupons and in concentrations such that the photochromic response is not a function of the benzoxazine concentration in the coupon.

EXAMPLE 2

(Comparative)

The procedures of Example 1 were repeated using a homopolymer of diethylene glycol (bis(allyl carbonate) as the substrate, and about 2.6 phm of diisopropyl peroxydicarbonate. The polymerizate had a 15 second Barcol hardness of greater than 10. Imbibition of the same spiro(indolino)benzoxazines reported in Example 1 in the substrate of this Example was performed at 150° C. for 90 minutes to achieve a concentration of benzoxazine in the test compounds similar to that obtained for the coupons described in Example 1. Luminous transmission and color coordinates of the benzoxazine-containing poly[diethylene glycol bis(allyl carbonate)] test coupons are tabulated in Table I and reported as Examples 2-A, 2-B, 2-C and 2-D.

TABLE I

| ACTIVATED LUMINOUS LIGHT TRANSMISSION (Y, %) and Color Coordinates | | | | | | | | |
|---|---|---|---|---|---|---|---|---|
| Example | 95° F. | | | 72° F. | | | 50° F. | | |
| | Y | a* | b* | Y | a* | b* | Y | a* | b* |
| 1-A | 73.8 | 2.2 | −0.4 | 53.5 | 7.3 | −7.2 | 33.1 | 14.2 | −14.0 |
| 1-B | 67.2 | 1.2 | −5.2 | 44.3 | 4.3 | −14.7 | 26.9 | 8.7 | −22.2 |
| 1-C | 75.8 | 1.6 | −1.2 | 50.7 | 7.0 | −9.1 | 27.3 | 15.3 | −17.2 |
| 1-D | 63.9 | 3.0 | −4.6 | 35.8 | 9.6 | −15.0 | 17.6 | 18.0 | −21.9 |
| 2-A | 77.1 | 0.7 | 2.2 | 61.9 | 4.6 | −3.0 | 43.1 | 10.1 | −9.2 |
| 2-B | 72.6 | 0.1 | −1.6 | 51.9 | 2.6 | −9.6 | 34.0 | 6.6 | −17.2 |
| 2-C | 79.7 | 1.2 | −0.2 | 59.5 | 5.3 | −5.9 | 35.3 | 12.7 | −13.8 |
| 2-D | 70.1 | 2.4 | −3.2 | 45.7 | 7.4 | −11.5 | 23.6 | 15.6 | −19.8 |

The data of Table I show that in the case of all of the samples tested, luminous transmission (Y) of the lenses prepared with the polyol(allyl carbonate) composition of Example 1 were in each case lower than the luminous transmission of the homopolymer of diethylene glycol bis(allyl carbonate), i.e., Example 2.

EXAMPLE 2

A sample of Uvithane ® 893 urethane diacrylate was warmed in a water bath to 55° C. and 180.02 grams of the warmed sample charged to a glass pot. 420.04 grams of diethylene glycol bis(allyl carbonate) was added to the pot and the mixture warmed in the water bath. The mixture was stirred thoroughly with a mechanical stirrer until there was only one phase. The resulting blend was cooled to room temperature and 2.00 phm (12.01 grams) of diisopropyl peroxydicarbonate and to the cooled blend. After further stirring for 15 minutes, the peroxydicarbonate-containing blend was poured into flat glass molds separated by a 0.125 inch (0.318 centimeter) gasket and cured anaerobically by heating it in an oven slowly to 105° C. over about 17 hours. The polymerizate had a 15 second Barcol hardness of greater than 10. The cured cast sheet were cut into 2 inch (5.1 centimeters)×2 inch (5.1 centimeter) square coupons for subsequent use.

A 2 inch (5.1 centimeter) square sheet of Whatman No. 4 filler paper was saturated with a 4 weight percent solution of 1-n propyl-3,-3-dimethyl-5-methoxyspiro(indoline)-2,3'[3H]pyrido[3,2-f]-[1,4]benzoxazine] in toluene. The filter paper was air dried until free of toluene. The paper containing the photochromic compound was placed on top of one of the 2 inch (5.1 centimeter) square test coupons. The test coupon and filter paper were placed between two aluminum plates (0.125 inches (0.318 centimeter)×2.25 inches (5.27 centimeters)×2.25 inches (5.72 centimeters)) and the resulting assembly heated to 130°–135° C. for 90 minutes. After cooling and separation from the assembly, the surface of the cooled resin coupons was cleaned with acetone and the aforedescribed imbibition process repeated with a fresh sample of saturated filter paper. After a further cleaning of the resin coupon with acetone, it was exposed to light from the Xenon Arc Solar Simulator of Example 1.

Luminous transmission of the test coupon was determined on a color spectrometer at 57° F. (14° C.), 77° F. (25° C.) and 95° F. (35° C.). Data is tabulated in Table II as Example 3A.

The above procedure was repeated with a resin polymerizate prepared from diethylene glycol bis(allyl carbonate) homopolymer, and about 2.25 phm of diisopropyl peroxydicarbonate. The polymerizate had a 15 second Barcol Hardness of greater than 10. Imbibition was performed at 150° C. for 90 minutes to achieve a pyrido benzoxazine concentration in the test coupon of the homopolymer similar to that obtained in the copolymer polymerizate. Data is presented in Table II as Example 3-B.

EXAMPLE 4

The procedure of Example 3 was repeated using the spiro(indolino)benzoxazine, 5,7-dimethoxy-1',3',3', 4' (and 6'), 5'-pentamethyl spiro[2H-1,4-benzoxazine-2,2'-indoline], a 10 weight percent solution of the spiro(indolino)benzoxazine and 2.75 phm of diisopropyl peroxydicarbonate for Example 4-B. The data is tabulated in Table II as Examples 4-A and 4-B.

TABLE II

| | LUMINOUS LIGHT TRANSMISSION | | | | |
|---|---|---|---|---|---|
| Exp. No. | Polymer Type | Unactivated (%) Y at 72° F. | Activated (%) Y at °F. | | |
| | | | 57 | 77 | 95 |
| 3-A | Copolymer | 83.1 | 11.4 | 24.9 | 52.5 |
| 3-B | Homopolymer | 83.3 | 12.9 | 30.0 | 60.3 |
| 4-A | Copolymer | 90.6 | 13.6 | 40.7 | 70.3 |
| 4-B | Homopolymer | 89.7 | 23.8 | 50.0 | 73.8 |

The data of Table II show that the activated luminous transmittance values for the test coupons prepared from the copolymer are lower at each temperature, i.e., less light transmitted, than the comparable homopolymer of poly[diethylene glycol bis(allyl carbonate)], which shows that the polyol(allyl carbonate) composition of the present invention provides an improved response over the temperatures measured, e.g., from 57° F. (14° C.).

EXAMPLE 5

The procedure of Example 3 was used to prepare cured cast sheet of a blend of 70 weight percent diethylene glycol bis(allyl carbonate) and 30 weight percent Uvithane® 893 urethane diacrylate, an aliphatic polyesterurethane diacrylate. The procedure of Example 3 was used to imbibe the spiro(indolino)benzoxazine, 5,7-dimethoxy-1',3',3',4' (and 6'), 5'-pentamethyl spiro[2H-1,4-benzoxazine-2,2'-indoline], into 2 inch (5.1 centimeter) square test coupons, except that a 10 weight percent solution of the benzoxazine in toluene was used to saturate the filter paper. Luminous transmission of the test coupon was determined as in Example 3. Data is tabulated in Table III as Experiment No. 5a.

The aforesaid procedure was repeated using a polymerizate prepared from polymerizing diethylene glycol bis(allyl carbonate) using 2.25 phm diisopropyl peroxydicarbonate. Data is tabulated in Table III as Experiment No. 5B.

TABLE III

| | LUMINOUS LIGHT TRANSMISSION | | | | |
|---|---|---|---|---|---|
| Exp. No. | Polymer Type | Unactivated Y at 72° F. | Activated (%) Y at °F. | | |
| | | | 57 | 77 | 95 |
| 5-A | Copolymer | 88.9 | 12.2 | 39.6 | 68.2 |
| 5-B | Homopolymer | 88.4 | 18.8 | 51.2 | 75.2 |

The data of Table III show that the activated luminous transmittance values for the test coupons from the copolymer are lower, i.e., less transmittance, at each temperature than the comparable homopolymer of diethylene glycol bis(allyl carbonate). Such data demonstrates that the copolymer composition of the present invention provides an improved equilibrium response over the temperature measured, e.g., from 57° F. (14° C.) to 95° F. (35° C.).

Although the present invention has been described with reference to the specific details of particular embodiments thereof, it is not intended that such details be regarded as limitations upon the scope of the invention except insofar as and to the extent that they are included in the accompanying claims.

What is claimed is:

1. A polymerizable organic resin composition comprising a homogeneous copolymerizable blend of:
   (a) from about 55 to about 90 weight percent of polyol(allyl carbonate),
   (b) from about 10 to about 40 weight percent of aliphatic polyurethane having ethylenic unsaturation at its terminal ends, and
   (c) from about 1 to about 4 weight percent of a difunctional monomer selected from the group consisting of allyl methacrylate and allyl acrylate.

2. The polymerizable organic resin composition of claim 1 wherein the polyol(allyl carbonate) is diethylene glycol bis(allyl carbonate), the aliphatic polyurethane is an aliphatic polyurethane diacrylate, and the difunctional monomer is allyl methacrylate.

3. The polymerizable organic resin composition of claim 2 wherein the polyol(allyl carbonate) composition comprises:
   (a) from about 60 to about 80 weight percent of diethylene glycol bis(allyl carbonate), (b) from about 20 to about 80 weight percent of the polyurethane diacrylate, and (c) from about 1 to about 2 weight percent of allyl methacrylate.

4. The polymerizable organic resin composition of claim 1 wherein the aliphatic polyurethane may be represented by the expression, $$D-R''-B-A-B-R''-D,$$

wherein:
(a) D represents the terminal functional group containing ethylenic unsaturation and is selected from members of the group consisting of $CH_2=C(R_1)-C(O)O-$, $CH_2=CH-CH_2-NH-C(O)O-$ and $CH_2=CH-CH_2-O-C(O)O-$, wherein $R_1$ is hydrogen or methyl,
(b) R'' represents a bivalent $C_1-C_{10}$ alkylene,
(c) B represents an aliphatic bis carbamate moiety originating from the corresponding aliphatic diisocyanate, and
(d) A represents the residue of a polyester diol.

5. A solid organic resin prepared by polymerizing the composition of claim 1.

6. A solid organic resin prepared by polymerizing the composition of claim 2.

7. A solid organic resin prepared by polymerizing the composition of claim 3.

8. The organic resin composition of claim 4 wherein the polyester is selected from the group consisting of poly(1,4-butylene adipate), poly(1,4-butylene succinate), poly(1,4-butylene glutarate), poly(1,4-butylene pimelate), poly(1,4-butylene suberate), poly(1,4-butylene azelate), poly(1,4-butylene sebacate) and poly(epsilon caprolactone).

9. The polymerizable organic resin composition of claim 1 wherein the aliphatic polyurethane may be represented by the expression, $$D-R''-B-A-B-R''-D,$$

wherein:
(a) D represents the terminal functional group containing ethylenic unsaturation and is selected from members of the group consisting of $CH_2=C(R_1)-C(O)O-$, $CH_2=CH-CH_2-NH-C(O)O-$ and $CH_2=CH-CH_2-O-C(O)O-$, wherein $R_1$ is hydrogen or methyl,
(b) R'' represents a bivalent $C_1-C_{10}$ alkylene,
(c) B represents an aliphatic bis carbamate moiety originating from the corresponding aliphatic diisocyanate, and (d) A represents the residue of a saturated aliphatic diol, polyether diol, polycarbonate diol for polyester diol.

10. The organic resin composition of claim 9 wherein A represents the residue of $C_2-C_6$ alkane diol, a poly(oxyethylene)glycol having a molecular weight of from 750 to 3300, poly(oxypropylene) glycol having a molecular weight of from 550 to 3300, and polyester diol having a molecular weight from about 500 to 2500.

11. The organic resin composition of claim 1 wherein the homogeneous copolymerizable blend comprises:
(a) from about 60 to about 80 weight percent of diethylene glycol bis(allyl carbonate),
(b) from about 20 to about 30 weight percent of aliphatic polyurethane having ethylenic unsaturation at its terminal ends, and
(c) from about 1 to about 4 weight percent of a difunctional monomer selected from the group consisting of allyl methacrylate and allyl acrylate.

12. The organic resin composition of claim 11 wherein the aliphatic polyurethane may be represented by the expression, $$D-R''-B-A-B-R''-D,$$

wherein
(a) D represents the terminal functional group containing ethylenic unsaturation,
(b) R'' represents a bivalent $C_2-C_4$ alkylene,
(c) B represents an aliphatic bis carbamate moiety originating from the corresponding aliphatic diisocyanate, and
(d) A represents the residue of a saturated aliphatic diol or polyester diol.

13. The organic resin composition of claim 12 wherein the polyester diol is the product of a dicarboxylic acid having from 6 to 10 carbon atoms and aliphatic glycol having from 4 to 8 carbon atoms.

14. The organic resin composition of claim 12 wherein the aliphatic polyurethane is a diacrylate terminated polyesterurethane.

15. The organic resin composition of claim 1 wherein the polyol(allyl carbonate) is diethylene glycol bis(allyl carbonate).

16. The organic resin composition of claim 15 wherein the aliphatic polyurethane is diacrylate terminated polyesterurethane.

17. The organic resin composition of claim 16 wherein the diacrylate terminated polyesterurethane is derived from a polyester diol having a molecular weight of from about 900 to 1300.

18. A solid organic resin prepared by polymerizing the composition of claim 13.

19. A solid organic resin prepared by polymerizing the composition of claim 17.

* * * * *

UNITED STATES PATENT AND TRADEMARK OFFICE
CERTIFICATE OF CORRECTION

PATENT NO. : 5,110,881

DATED : May 5, 1992

INVENTOR(S) : Douglas S. McBain et al

It is certified that error appears in the above-identified patent and that said Letters Patent is hereby corrected as shown below:

Column 18, claim 10, line 8, after "from", insert --400 to 2000, polycarbonate diol having a molecular weight of from --

Signed and Sealed this

Twenty-second Day of June, 1993

*Attest:*

MICHAEL K. KIRK

*Attesting Officer*  Acting Commissioner of Patents and Trademarks